US006392821B1

(12) United States Patent
Benner, Jr.

(10) Patent No.: US 6,392,821 B1
(45) Date of Patent: May 21, 2002

(54) LIGHT DISPLAY PROJECTOR WITH WIDE ANGLE CAPABILITY AND ASSOCIATED METHOD

(76) Inventor: William R. Benner, Jr., 1536 Cherry Ridge Dr., Heathrow, FL (US) 32746

( * ) Notice: Subject to any disclaimer, the term of this patent is extended or adjusted under 35 U.S.C. 154(b) by 33 days.

(21) Appl. No.: 09/672,286

(22) Filed: Sep. 28, 2000

(51) Int. Cl.[7] .................. G02B 17/00; G02B 27/00; G02F 1/11; G03B 21/26
(52) U.S. Cl. .................. 359/727; 359/286; 359/287; 359/578; 353/34; 353/37
(58) Field of Search .................. 348/36, 37, 38, 348/39; 359/726, 727, 728, 725, 286, 287, 578; 382/154; 353/34, 30, 35, 36, 37

(56) References Cited

U.S. PATENT DOCUMENTS

| | | | |
|---|---|---|---|
| 3,992,718 A | * 11/1976 | Driskell | 348/36 |
| 4,006,970 A | 2/1977 | Slater et al. | 359/223 |
| 4,012,126 A | 3/1977 | Rosendahl et al. | 359/725 |
| 4,246,603 A | 1/1981 | Wolff | 348/36 |
| 4,297,723 A | 10/1981 | Whitby | 348/36 |
| 4,326,775 A | 4/1982 | King | 359/725 |
| 4,395,093 A | 7/1983 | Rosendahl et al. | 359/725 |
| 5,090,789 A | * 2/1992 | Crabtree | 359/10 |
| 5,115,266 A | 5/1992 | Troje | 396/21 |
| 5,130,838 A | 7/1992 | Tanaka et al. | 359/200 |
| 5,231,538 A | * 7/1993 | Anderson | 359/462 |
| 5,410,371 A | * 4/1995 | Lambert | 348/796 |
| 5,546,139 A | 8/1996 | Bacs, Jr. et al. | 348/754 |
| 5,760,826 A | 6/1998 | Nayar | 348/36 |
| 6,226,035 B1 | * 5/2001 | Korein et al. | 348/335 |
| 6,233,086 B1 | * 5/2001 | Hardiman | 359/290 |
| 6,304,285 B1 | * 10/2001 | Geng | 348/36 |

* cited by examiner

Primary Examiner—Loha Ben
Assistant Examiner—David N. Spector
(74) Attorney, Agent, or Firm—Allen, Dyer, Doppelt, Milbrath & Gilchrist, P.A.

(57) ABSTRACT

A projector for producing a visually perceptible light image along predetermined vector coordinates, includes a light source for producing a beam of light along a light path; a deflector positioned to deflect the beam of light along the vector coordinates; a focusing lens for focusing the deflected light beam; and a projection reflector for reflecting the beam along the vector coordinates to thereby form the visually perceptible light image. A preferred light source comprises a laser, and a preferred reflecting surface has a substantially convex shape, preferably including a parabolic reflector. A method aspect of the invention includes producing a visually perceptible light image by predetermining vector coordinates defining the visually perceptible light image; generating a substantially parallel beam of light; modulating the beam of light by turning it off and on at predetermined time intervals; deflecting the modulated beam of light along the predetermined vector coordinates so as to produce a plurality of vectored light beams; focusing the plurality of vectored light beams to thereby substantially prevent distortion of the visually perceptible light image; and reflecting the plurality of focused light beams from a substantially convex reflecting surface along the predetermined vector coordinates to thereby produce the visually perceptible light image.

19 Claims, 2 Drawing Sheets

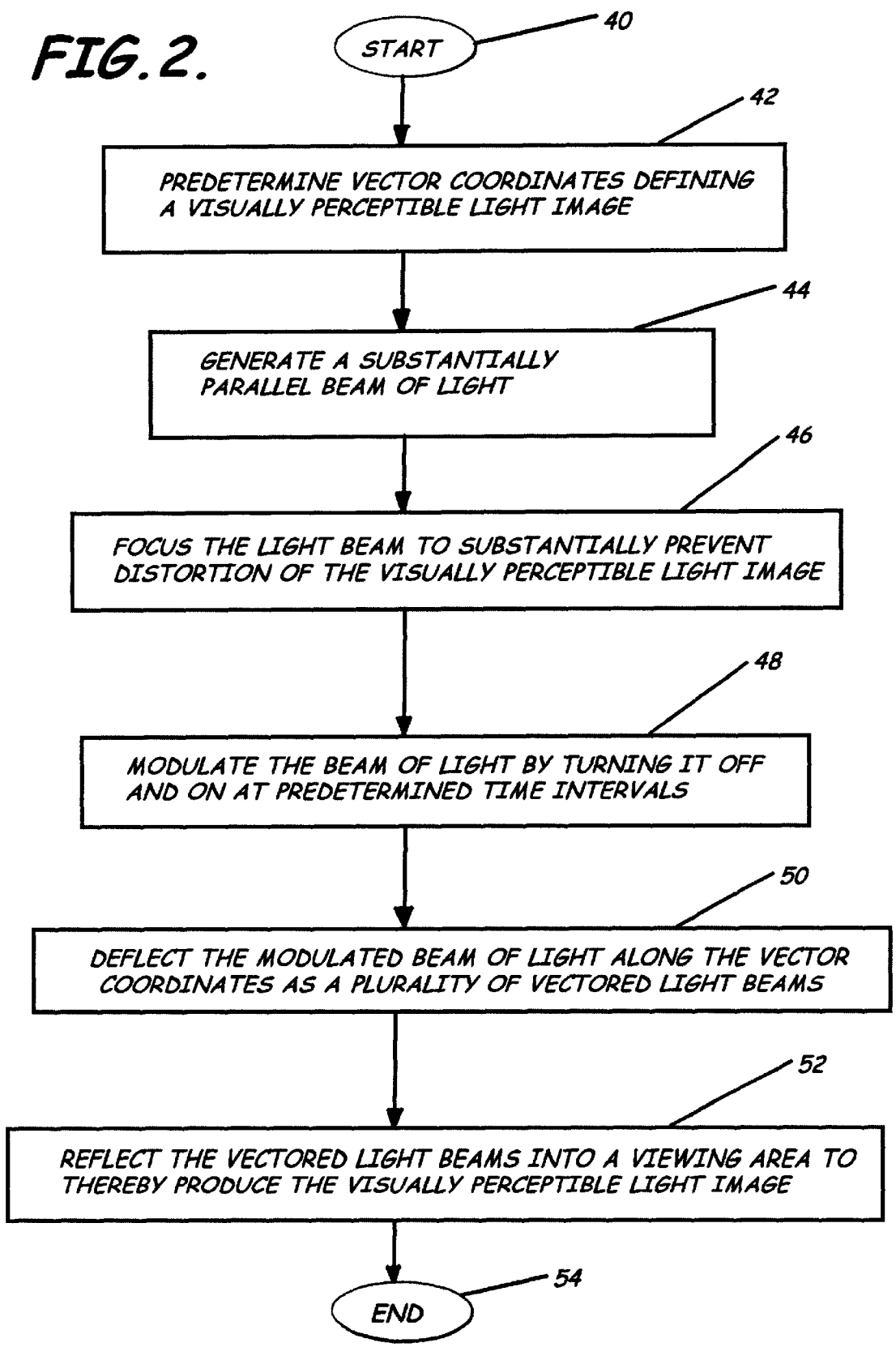

LIGHT DISPLAY PROJECTOR WITH WIDE ANGLE CAPABILITY AND ASSOCIATED METHOD

FIELD OF THE INVENTION

The present invention relates to the field of light display projectors and, more particularly, to a laser projector able to project within an increased viewing area.

BACKGROUND OF THE INVENTION

There are various types of laser projectors being used in the field of laser light display. Currently known projectors generally include a laser, a color or intensity modulator, a number of beam deflecting actuators, a pair of galvanometric scanners, and a number of diffraction gratings for creating effects.

Present laser projection systems are used for generating abstract or vector graphic images by deflecting the laser beam from one of the beam deflecting actuators to the pair of galvanometric scanners which project an image on a projection surface. The resulting projection area which the galvanometric scanners are able to cover is dictated by the deflection angle capability of the scanners, which is generally about 60 degrees or less. This restricts the largest image that may be produced on a projection surface to a size about equal to the distance from the projector to the projection surface. One example of a projector which employs multiple pairs of galvanometric scanners is described by Tanaka in U.S. Pat. No. 5,130,838.

To produce an array of beams from a diffraction grating, one of the beam deflecting actuators directs the laser beam to a fixed diffraction grating. The light passing through or reflecting from the diffraction grating is directed into the air to produce an array of visible beams. The direction of this array of beams is determined by the fixed position of the diffraction grating, with the angle of the beams and the number of beams fixed by the type of diffraction grating being used.

These laser projectors can produce a static beam for beam pointing applications by directing the laser beam from one of the beam deflecting actuators onto a fixed mirror which then directs the laser beam to the desired target. However, in order to direct a static beam or diffraction grating effect toward a given target, movable mirror mounts must be adjusted with precision to reflect the laser beam. Usually, these adjustments must be made manually by an operator, and shortly before each presentation. The operator must necessarily work in very close proximity to the laser beam, creating the opportunity for the operator to be physically injured by direct exposure to the beam.

Prior art laser projectors are generally only able to perform one of these tasks at a time. For example, the projector may produce either a graphic image, a diffraction grating effect, or a static beam, but only one effect at a time using the full power of the laser. There is a need for a laser projector which can produce more than one of these effects simultaneously. In addition, prior art projectors are limited in their area of coverage due to their dependence on fixed components including galvanometric scanners, diffraction gratings, or reflecting mirrors. If a greater coverage area is desired, multiple components must be used for producing the various effects, for example, multiple pairs of galvanometric scanners for producing graphics in different locations, multiple fixed diffraction gratings for producing arrays of beams, and multiple reflecting mirrors fixed at various locations for producing aimed static beams. This adds to the cost, complexity, optical inefficiencies, and alignment difficulties encountered with prior art laser projectors. One example of a projector which employs multiple pairs of galvanometric scanners, multiple reflecting mirrors, and multiple gratings is that described by Slater et al. in U.S. Pat. No. 4,006,970.

Several systems have been devised in attempts to cover a greater area, particularly with graphic images. One known system uses a rotating reflecting mirror to cover an area up to 360° in azimuth. However, this system uses a flat reflector, so that the area covered at one any one time is limited to the deflection angle of the galvanometric scanners. In addition, to address a new area the rotating reflecting mirror must be actuated by a motor. Because the mirror has a large mass, it takes a relatively long time for the motor to move the mirror to project toward a new area.

Another approach which is particularly well suited to domed projection surfaces is disclosed in U.S. Pat. No. 5,546,139 to Bacs et al. The Bacs projector uses a wide angle lens array to increase the deflection angle of the galvanometric scanners. Images created with this system can cover a 360° azimuth by 180° angle, which is normally oriented upward toward a dome. This system is expensive, decreases light throughput, and has a distinct focal length which results in increased beam divergence. In addition, manufacturing tolerances for the lenses are critical to ensure optimal lens performance, and any misalignment in the lens array or poor curvature in any one lens can cause chromatic aberration in the images.

SUMMARY OF THE INVENTION

With the foregoing in mind, the present invention advantageously provides a laser projector which projects graphic imagery covering an increased area, and an array of beam effects to be viewed 360° in mid-air, both of which are easy to adjust and to target. The present laser projector is capable of simultaneously producing multiple visually perceptible images and effects directed toward different areas, while not requiring beam deflecting actuators, fixed diffraction gratings, fixed reflecting mirrors, or adjustable mirror mounts. The laser projector herein disclosed projects an array of beams which is visually perceived as a graphic image. The claimed laser projector does not require manual adjustment of components, and thereby does not expose an operator to potential injury due to accidental direct exposure to the laser beam.

The projector comprises a light source, preferably a laser, for producing an intense light beam, a color and intensity modulator for modulating the intensity and color of the light beam, a deflector for deflecting the light beam, and a projection reflector, which preferably includes a parabolic, spherical, hyperbolic or polyhedral reflector depending on the desired application. A focusing lens or lens array is positioned in the projector's light path for producing a visually perceptible image having an improved focus and for reducing astigmatism. In addition, an optical fiber is preferably positioned connecting portions of the light path within the projector, such as between the light source and the deflector. Such use of an optical fiber, or fiber optic cable, allows the projector to be taken apart for transport, and joined back together for operation. In operation, this arrangement also permits one component of the projector to be spaced-apart from a second component, the light path between the two components formed by an optical fiber light conduit connecting the components. The projector can thus be made modular for certain installations which require portability or small component size.

The present projector is capable of replacing prior art light projectors since it can perform all of the tasks of these projectors while eliminating many components, with associated cost savings, increased reliability, and added safety. Additionally, the present laser projector will simultaneously produce multiple effects and visually perceptible images, directing these around 360° and to about 40° or more of elevation for viewing in mid-air or on a projection surface.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is a flow diagram of a method according to an embodiment of the present invention.

DETAILED DESCRIPTION OF THE PREFERRED EMBODIMENT

Figure 1:
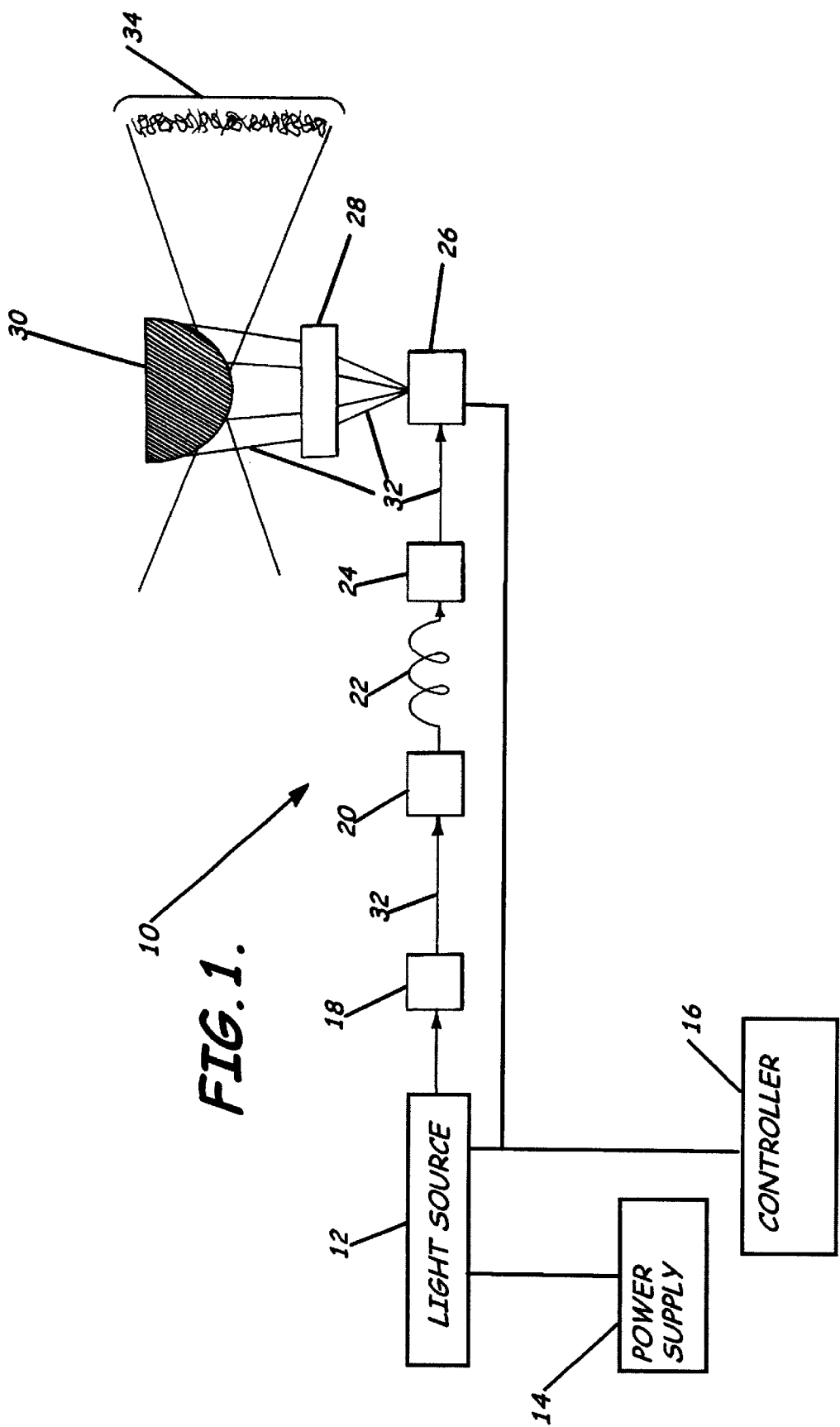
FIG. 1 is a schematic diagram of the present projector.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

The invention discloses a projector 10 for projecting an intense beam of light along defined vector coordinates so as to form a visually perceptible light image. The projector 10 simultaneously produces multiple visually perceptible light images and projects those images within an area of coverage of about a 360° azimuth by about 40° elevation or more, the area being approximately shaped as a vertically extending cylinder or truncated hemisphere. The skilled artisan will understand that the visually perceptible light image referred to herein and produced by the present invention is an artifact of the limitations of human vision. That is, the projector does not per se project a light image, but rather projects a light beam along predetermined vector coordinates, the vector coordinates shifting sufficiently quickly so that the human eye cannot detect the shift, but perceives a light image formed due to the phenomenon known as "persistence of vision." The visually perceptible light image may be formed on the four inside walls of a rectangular room, or may be formed in mid-air, directly on an audience, or in any other manner for creating a desired effect.

In one embodiment, the projector 10 includes a light source 12 producing a beam of light along a light path 32; a deflector 26 positioned so as to deflect the beam of light in the light path 32 along predetermined vector coordinates; a focusing lens 28 positioned to focus the deflected light beam; and a projection reflector 30 having a reflecting surface for receiving the focused deflected light beam and for reflecting the beam along the vector coordinates into the viewing area so as to produce a visually perceptible light image 34. The invention also includes a power supply 14 connected to the light source 12, the light source preferably being a laser for producing an intense beam of light. The light source 12, as known in the art, could be one which produces a single wavelength, such as a diode-pumped solid-state laser, or one which produces multiple wavelengths simultaneously, such as an Argon or Argon/Krypton laser. In the present invention, it is preferred that the light source generate a beam of substantially parallel light rays, and that the diameter of the beam be small, about 5 mm or less.

Once the light beam is generated, a color and intensity modulator modulates the beam accordingly, and turns the beam off and on. When producing light graphics with a light beam directed along predetermined vector coordinates, it is necessary to turn the light beam on, move the light beam so as to create the appearance of drawing a line, and then turn the light off so that the beam can be repositioned along a new vector coordinate before drawing a new line. Similarly, when producing patterns of beams the light beam is positioned to the desired location, turned on for a predetermined period, then turned off and repositioned to a new location. The process of turning the beam off while repositioning it along a new vector coordinate is known in the art as "blanking." The present projector blanks at sufficiently fast frequency so as to not be perceptible to the human eye, which sees a visually perceptible light image rather than discontinuous beams of light.

In addition to blanking, it is also useful to control the intensity of the light beam, that is, its brightness, while the beam remains turned on. This is desirable so that graphic images and beams may be faded in and out. If the light source 12 is capable of producing multiple wavelengths, it is additionally desirable to independently control the intensity of each wavelength so that multiple colors and variable hues can be produced. Depending on the type of light source 12, controlling the intensity of the beam may be accomplished directly by controlling the amount of current provided to the light source by the power supply 14. However, in certain types of lasers, particularly multi-wavelength lasers, controlling the intensity or color of the light beam must be accomplished by some external device or devices through which the beam is directed.

Currently, the most common device for controlling the intensity and color of a multi-wavelength laser light source 12 is a poly-chromatic acousto-optic modulator (PCAOM). The PCAOM offers the ability to simultaneously control the intensity of from about 4 to about 12 different wavelengths, and controlling the intensity at a frequency rate of up to about 100 KHz and beyond. Since the intensity of each wavelength can be controlled separately with this device, multiple colors can be produced. Preferred PCOAMs for use in the present invention are known in the art and include those made by several companies, including NEOS Technologies, MVM Electronics and A.A., S.A.

In the present invention, "modulation" of the light beam is intended to mean controlling the amount of light and the color of the light for the entire beam of light, and not just for portions of the beam. "Spatial modulation" is employed in other projection inventions to indicate that portions of the light beam are controlled by allowing some of the light to flow through a filter of some type. For example, a spatial light modulator, or SLM, is a generally rectangular device having pixels which allow light to flow through portions of the SLM. The SLM is an electronic device whose function is analogous to placing a piece of film in the path of the light beam, to thereby allow only portions of the light beam to flow therethrough to form an image. Modulation which controls portions of the light beam is, therefore, in a sense "spatial." Temporal modulation in the present invention is accomplished primarily by turning the beam on and off, thereby producing a "temporal" modulation, since the beam changes with time. Preferably, in the present invention, modulation of the beam is never spatial as the entire beam is modulated rather than just selected areas of the beam, and always temporal since the beam is turned on and off with time.

Once the laser light beam has been produced and acted on by the modulator 18, it is directed to a deflector 26. The deflector 26, or scanning system, is as known in the art and comprises an orthogonal arrangement of two galvanometric scanners and associated control electronics. Deflectors comprising galvanometric scanners include small, limited-rotation motors capable of moving small mirrors at rates up to about 10 KHz. The orthogonal arrangement of two galvanometric scanners allows the scanners to be used in an X-Y fashion, where signals that correspond to vector coordinates may be used as an input for deflector 26 control. A deflector 26 having a galvanometric scanning system as known in the art may be used, the most commonly used models including the Cambridge Technology 6800 HP system and the General Scanning G-120 system. Those skilled in the art will recognize that the deflector used in the invention and referred to in the description may be one of several types of deflectors, including a galvanometric scanner, an acousto-optic beam deflector, an electro-optic beam deflector, a piezo-electric deflector, or a dynamic array of mirrors such as a digital micromirror device (DMD) or a grating light valve (GLV). It should be noted that in the present invention the light beam is physically deflected along predetermined vector coordinates so as to project a small beam of light in apparently constant motion to thereby create the illusion resulting in the visually perceptible light image.

A further consideration is that the light source 12 itself can be quite large in comparison to the rest of the projection components, and it may be desirable to locate the light source somewhat removed from the rest of the components of the projector 10. Th artisan will understand that, for example, the projector may be built in sections so that when set up for operation the light source may be set a distance apart from the other components. In such an example, an optical fiber 22 is preferably connected to the light source 12 to carry the light beam to the subsequent component in the system. The optical fiber 22 may be connected within the projector 10 by using fiber optic couplers 20, 24, and positioned depending on the type of light source 12 used. If the light source 12 intensity is controllable directly by varying the amount of current applied to the light source 12, and no other external intensity/color control devices are used, the optical fiber 22 may be connected to the output of the light source 12 and to the input of the deflector 26. However, if light source 12 intensity is controlled by an external intensity/color modulator 18, such as a PCAOM, the optical fiber 22 may preferably be connected between the light source 12 output and the modulator 18 input, or in the alternative the optical fiber 22 may be connected further downstream in the light path 32 between the modulator 18 output and the deflector 26 input. However, because some intensity/color modulators such as PCAOMs are sensitive to beam divergence and polarization, it is preferable to connect the optical fiber 22 between the output of the modulator 18 and the input of the deflector 26. Any suitable optical fiber 22 known in the art may be used in the present invention, but keeping in mind that it is preferable to maintain the beam diameter relatively small.

An additional component of the laser projector 10 is a programmable controller 16, which is preferably a computer system having suitable interface hardware, the computer being programmed to control the light source 12, the modulator 18, and the deflector 26. Such hardware and software as known in the art are suitable for controlling the present laser projector 10. The interface hardware generally includes a circuit board which connects with the computer. This interface circuit board has digital to analog converters and voltage amplifiers so that signals can be produced which correspond to the vector coordinates, and to the intensity of each light source 12 wavelength.

The software program generates the vector coordinates and intensity levels and transfers these digital data to the digital to analog converters in the interface circuit board. The software generally offers the ability to produce multiple images and beam patterns simultaneously using a technique called multi-track output, which is analogous to multi-track recording in the audio arts. Multi-track output is produced by controlling the laser projector 10 to draw one graphic image or beam pattern, then blank the beam and reposition it to a new location, followed by turning on the beam and drawing another graphic image or beam pattern. Those skilled in the art will know that any suitable interface hardware and software may be used to control the present laser projector 10, including intensity, color, and X-Y scanning system. However, preferred hardware and software systems include the QuadMod™ series of hardware boards and the Lasershow Designer™ series of laser software, both from Pangolin Laser Systems.

Prior art light display projectors generally include the components similar to those described above, which have been known and available for perhaps over twenty years for producing laser graphics and beam patterns. Those skilled in the art will be familiar with these components and will know how to use them.

Prior art laser projectors, however, suffer from various limitations which are overcome by the present invention. In prior art systems, the graphic and beam output is restricted to one general area of projection. The output image of such a system may be analogized to that produced by a conventional slide projector. The image may be projected to a viewing area, however the prior art light display projector is unable to project the image behind itself, or substantially to the right or left of the projector. Prior art systems also cannot project in wide angle, or panoramic views. In order to cover a wider area or to produce a complete panoramic display, multiple projectors would be needed. For example, in a conventional photo slide projector various lenses may be used with a to increase or decrease the projection area. However, if such lenses were to be used in a light display projector they would generally alter the focus of the laser beam, causing any projected image to appear fuzzy, rather than well defined. Prior art light display projectors, therefore, generally do not employ such lenses and rely on the scan angle produced by deflectors, which typically have a limited projection angle of from about 20° to 60°.

One object of the present invention is to disclose a light display projector 10 capable of projecting graphic images and beams over a very wide viewing area generally shaped as an upright cylinder or truncated hemisphere. In order to create the wide area projection, the deflector 26 is positioned to deflect the light in a generally upward direction, instead of forward onto a projection screen. However, those skilled in the art will recognize that the deflector 26 may be variously positioned, depending on the desired characteristics for the projector. The upwardly directed output from the deflector 26 is reflected from a generally convex projection reflector 30 and the light is directed around the projector 10 in a substantially cylindrical or truncated hemispherical area of coverage to form a visually perceptible light image 34.

The skilled artisan will recognize that various shapes may be used for the projection reflector 30 in the present invention, including hemispherical, hyperbolic, parabolic, ellipsoid, conical, or even a multi-faceted array of mirrors. However, in a light display projector wherein the light source 12 is a laser, a parabolic projection reflector 30 is a preferred geometry, since it generally preserves the parallel quality of a laser light beam when the beam is projected onto the reflector 30 at an angle of incidence substantially parallel to the reflector's axis.

In general, curved reflectors effectively increase the scan angle from the deflector 26, but unfortunately also increase the beam diameter by the same amount, disturbing the substantially collimated aspect of the light in a laser beam. This effect tends to produce a de-focused, or fuzzy light beam at the target. Contrary to this effect, it is preferable to have a light beam as small as possible in diameter at the target. A curved projection reflector 30 acts in the manner of a negative lens which de-focuses the light beam by increasing both the scan angle and the beam diameter. A positive lens may be positioned relative to the projection reflector 30 to act as a focusing lens 28 for correcting the increased beam diameter, substantially focusing the beam. Such a focusing lens 28, or lens array, may be positioned adjacent the deflector 26 along the light path 32. The focusing lens 28 substantially focuses the incident beam on the projection reflector 30 to thereby counteract the de-focusing effect of the curved reflecting surface.

As noted, the light beam's angle of incidence to the parabolic reflector 30 is preferably substantially parallel to the projection reflector's axis. Ordinarily, this would require a relatively long distance between the deflector 26 and the reflector 30, and would consequently demand a relatively small scan angle. However, such elongated positioning is technically difficult to achieve due to long physical support members which would be required to hold the projection reflector 30. In addition, the long distance would dictate a small scan angle from the deflector 26, which would not provide optimal use of the deflector's resolution, and any inaccuracy of the deflector would be magnified. This is corrected in the present invention by a focusing lens 28 preferably placed in the light path directly downstream from the deflector 26. A focusing lens 28 thus positioned serves not only to focus the beam, but also to more effectively use the scan angle from the deflector 26. The deflector 26 is able to generally scan a relatively large scan angle of about 30° or more, and this angle is reduced by the focusing lens 28 while focusing the beam.

A preferred focusing lens 28 comprises a multi-element lens positioned in the light path downstream from the scanners. However, those skilled in the art will recognize that various focusing lens 28 configurations may be used, including simple plano-convex positive lenses. The focal length of the focusing lens 28 and its positioning are preferably coordinated for focusing the beam substantially on the surface of the projection reflector 30. One preferred approach is to position a focusing lens 28 having a 200 mm focal length lens in the light path 32 downstream from the deflector 26 and about 200 mm upstream from the projection reflector, as shown schematically in FIG. 1.

A controller 16, which is preferably a computer system connected to the projector 10, is used to control the functioning of the various components of the projector. The computer generates graphic images to be projected and pre-distorts the images so that they are correctly seen as visually perceptible images 34 on the viewing area. Such correction is required because of the curved shape of the projection reflector 30, and the fact that the projection area is substantially a cylinder or truncated hemisphere instead of a rectangle. This pre-distortion is substantially a geometric correction of the images, so that the visually perceptible image 34 appears without aberrations. Geometric correction is performed using a series of mathematical computations known in the art. The correction may also be performed using a technique known in the art as bi-linear interpolation.

A method aspect of the invention, shown in FIG. 2, from the start (Block 40) includes predetermining vector coordinates defining a visually perceptible light image (Block 42); generating a substantially parallel beam of light (Block 44); focusing the light beam to substantially prevent distortion of the visually perceptible light image (Block 46); modulating the light beam's intensity and color (Block 48); deflecting the light beam along predetermined vector coordinates as a plurality of vectored light beams (Block 50); and reflecting the focused light beams into a viewing area to thereby produce the visually perceptible light image (Block 52); whereafter the method stops (Block 54).

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A light display projector for projecting a beam of light along a plurality of predetermined vector coordinates so as to produce a light pattern forming a visually perceptible light image, said projector comprising:
   a light source for producing a beam of light extending along a light path;
   at least one focusing lens positioned relative to the light path to focus the light beam;
   a modulator positioned to modulate the intensity and color of the beam of light;
   a deflector positioned adjacent the light path to deflect the beam of light along the plurality of predetermined vector coordinates; and
   a projection reflector positioned to reflect the focused deflected light beam along the plurality of predetermined vector coordinates to thereby project the light pattern forming the visually perceptible light image.

2. The projector of claim 1, wherein said projection reflector comprises a substantially convex reflecting surface.

3. The projector of claim 1, wherein said projection reflector comprises a reflecting surface having a shape selected from spherical, hyperbolic, ellipsoid, and parabolic.

4. The projector of claim 1, wherein said projection reflector comprises a substantially conical reflecting surface.

5. The projector of claim 1, wherein said projection reflector comprises a plurality of reflecting surfaces.

6. The projector of claim 1, wherein the visually perceptible light image comprises monochromatic light.

7. The projector of claim 1, wherein the visually perceptible light image comprises polychromatic light.

8. The projector of claim 1, wherein the light path includes an optical fiber light conduit.

9. The projector of claim 1, further comprising at least one deflector selected from a galvanometric scanner, an acousto-optic beam deflector, an electro-optic beam deflector, a piezo-electric deflector, a digital micromirror device, and a grating light valve.

10. The projector of claim 1, wherein the projector is separable into at least two components, and wherein the light path connecting the at least two components comprises an optical fiber light conduit.

11. The projector of claim 1, wherein the visually perceptible light image is formed within about a 360° azimuth surrounding said projection reflector and exceeding about 40° of elevation therefrom.

12. The projector of claim 1, wherein the predetermined vector coordinates define an area of space shaped as a generally upright cylinder.

13. The projector of claim 1, wherein the predetermined vector coordinates define an area of space generally shaped as a truncated hemisphere.

14. The projector of claim 1, wherein the predetermined vector coordinates define an area of space wherein the visually perceptible light image appears to be in mid-air.

15. The projector of claim 1, wherein the predetermined vector coordinates define an area of space wherein the visually perceptible light image is formed simulating a light pattern created through a diffraction grating.

16. The projector of claim 1, wherein the light beam projected along the plurality of predetermined vector coordinates produces a plurality of simultaneously visually perceptible light images selected from a graphic image, a diffraction grating effect, and a static light beam, or a combination thereof.

17. The projector of claim 1, wherein the light beam projected along the plurality of predetermined vector coordinates produces at least one visually perceptible light image selected from a graphic image, a diffraction grating effect, and a static light beam.

18. The projector of claim 1, wherein the light path comprises a diameter of about 5 mm or smaller.

19. The projector of claim 1, wherein said at least one focusing lens is positioned relative to the light path downstream from said deflector for focusing the deflected light beam.

* * * * *